United States Patent [19]
Schwarz et al.

[11] 3,798,881
[45] Mar. 26, 1974

[54] LIQUID SPRAYER

[75] Inventors: Gerald L. Schwarz, Cleveland; Hugo Schlachet, Cleveland Heights, both of Ohio

[73] Assignee: Bessam Manufacturing, Inc., Cleveland, Ohio

[22] Filed: July 22, 1971

[21] Appl. No.: 165,236

[52] U.S. Cl.................. 55/230, 261/92, 239/221
[51] Int. Cl................................................ B01f 7/10
[58] Field of Search.......... 55/230; 239/221; 261/92

[56] References Cited
UNITED STATES PATENTS

| | | | |
|---|---|---|---|
| 1,503,755 | 8/1924 | Harrison | 55/230 |
| 2,428,842 | 10/1947 | Feinberg | 261/92 |
| 2,437,936 | 3/1948 | Carraway | 261/92 |
| 2,841,369 | 7/1958 | Carraway | 261/92 |
| 3,008,407 | 11/1961 | Roberts et al. | 239/220 |

*Primary Examiner*—Tim R. Miles
*Assistant Examiner*—Steven H. Markowitz
*Attorney, Agent, or Firm*—Robert J. Fay, et al.

[57] ABSTRACT

An apparatus for filtering, washing and cooling gases including a chamber having inlet ducting and outlet ducting. Gases conducted through the inlet ducting into the chamber are cleaned and cooled therein and removed through the outlet ducting. Within the chamber is a foraminous wall extending transverse to the direction of gas flow. Some means such as a fan is used to force the gas through the foraminous wall. A pool of water stands in the bottom of the chamber between the inlet ducting and the foraminous wall and a curtain of said water is sprayed from said pool by means of rotating discs and directional control mechanisms, whereby gas entering the chamber passes through the water curtain and is cleaned and cooled.

9 Claims, 7 Drawing Figures

PATENTED MAR 26 1974

INVENTORS
GERALD L. SCHWARZ
HUGO SCHLACHET
BY
Fay, Sharpe & Mulholland
ATTORNEYS

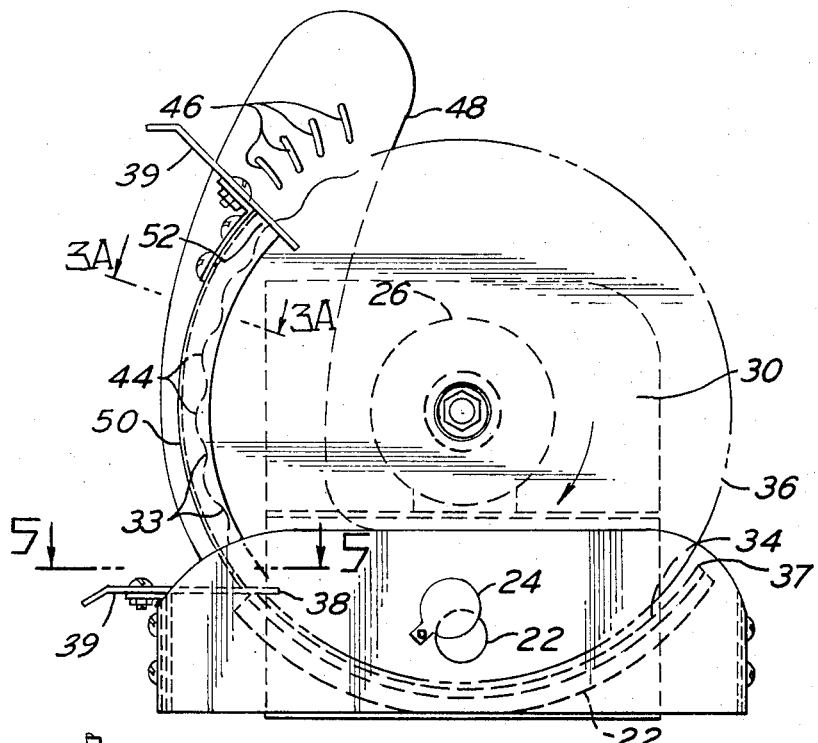
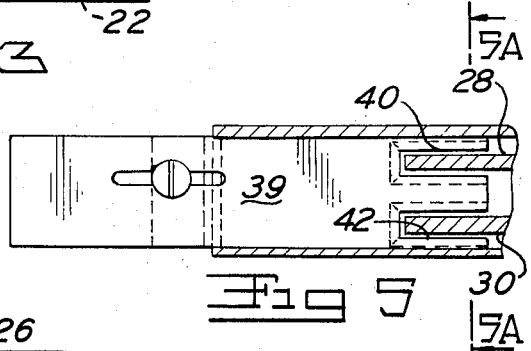
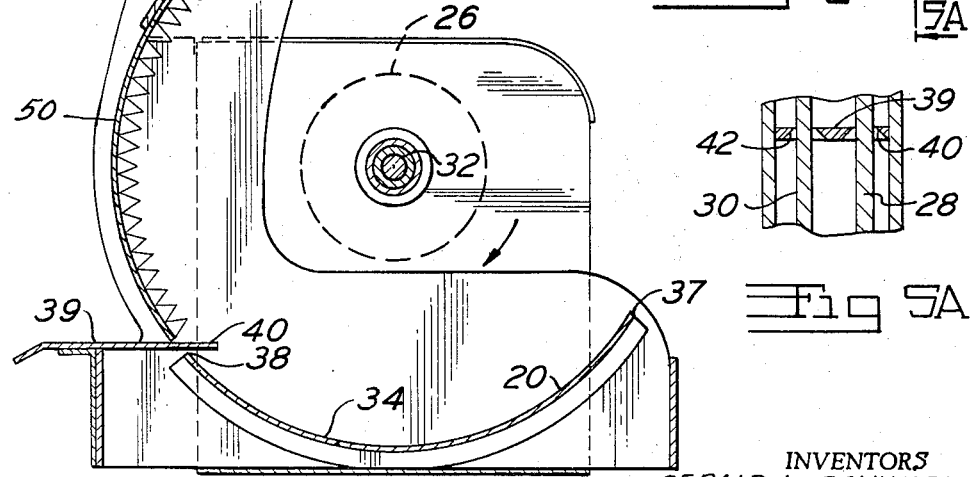

LIQUID SPRAYER

BACKGROUND OF THE INVENTION

This invention relates to apparatus for cleaning and cooling gases. It includes an old combination of components which make up a flow path for gaseous fluid. In some cases, the flow path is a closed system but this fact is immaterial. What is significant is the improved results obtained by the modified elements of the combination and the cooperative relationships of all the elements.

The combination of an inlet duct, a chamber and an outlet duct with a foraminous wall and water spray apparatus within the chamber are old in the art. All such combined apparatus are designed for substantially the same purpose, namely, cooling and cleaning the gases forced through the chamber. The primary problems encountered in the field are (1) excess power required to spray water or distribute it across the path of the moving gas (2) trying to insure a relatively uniform cooling, cleansing and humidifying of the gas that passes through the chamber and (3) fouling of the spraying device.

It is not unusual to position two foraminous walls in sequence in the flow path to insure that no large droplets of water are entrained in the gas passing through the chamber. Similarly, it is not unusual for the foraminous wall to take various shapes to increase the surface contact area.

Conventionally, water is sprayed vertically as a curtain between the inlet and the first foraminous wall by various mechanisms. Some devices spray water downwardly using high pressure pumps and nozzles while others spray the water upward through nozzles using high pressure pumps. Mineral deposits or suspended particles often foul the nozzles.

Additional prior art devices have included a cylindrical foraminous disc serving as the foraminous wall, the disc is partially immersed in water such that it picks up moisture when it rotates.

Another well known mechanism of water spraying is to have rotating metal discs which throw water into the air in the space between the foraminous wall and the inlet. Discs rotating either parallel with the flow of air or perpendicular to the flow of air have been tried. Examples of these two are illustrated in the patents to Carraway, U.S. Pat. No. 2,437,936 and to Feinberg, U.S. Pat. No. 2,428,842, respectively.

However, none of the prior art devices has satisfactorily solved the problem of how to spread a uniform curtain of water vapor across the cleansing and cooling chamber. Thus, the inventors have designed a new and unobvious mechanism for guaranteeing a relatively uniform spray which has solved the problem.

BRIEF DESCRIPTION OF THE INVENTION

A tank of water is located in the lower portion of a cooling chamber. The chamber is connected between an inlet duct and an outlet duct. An electric motor rotates a plurality of discs which extend substantially perpendicular to the direction of flow of the gas passing through the chamber. The lower portions of the discs are partially submerged in the water and a shroud encompasses the submerged portion of each.

As the discs rotate, they spray water tangentially and various guide means are used to direct the tangentially discharged spray in given directions and other means are employed to vary the fineness and character of the sprayed water, thus, to provide a uniform fog curtain across the full width of the chamber.

BRIEF DESCRIPTION OF THE DRAWINGS

FIG. 3 is an end view of FIG. 1 taken along line 3—3.

FIG. 3A is a fragmentary sectional view taken along line 3A—3A of FIG. 3.

FIG. 4 is an end view of the apparatus, partially in section, taken along line 4—4 of FIG. 1.

FIG. 5 is a fragmentary sectional view taken along line 5—5 of FIG. 3.

FIG. 5A is a fragmentary sectional view taken along line 5A—5A of FIG. 5.

PREFERRED EMBODIMENTS

Figure 1:
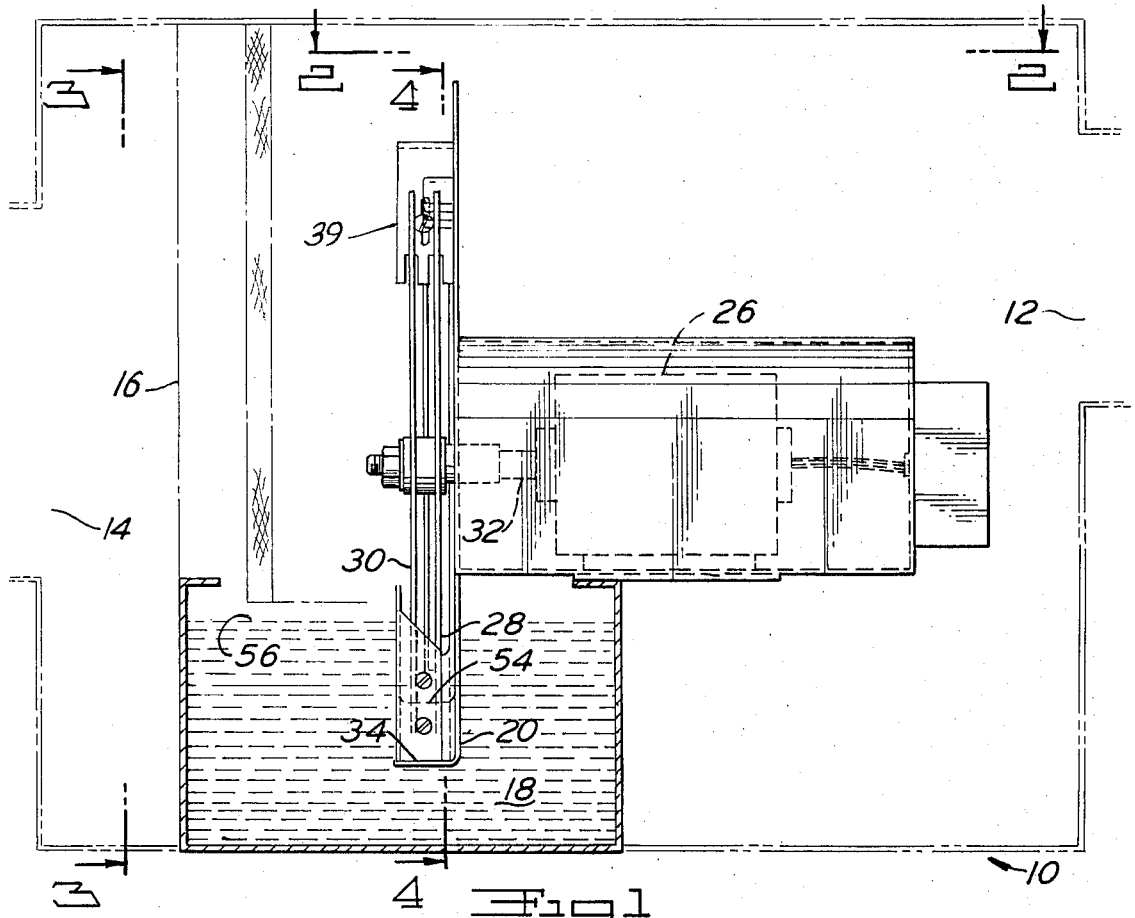
FIG. 1 is an elevational view of the spraying apparatus of this invention.
Figure 2:
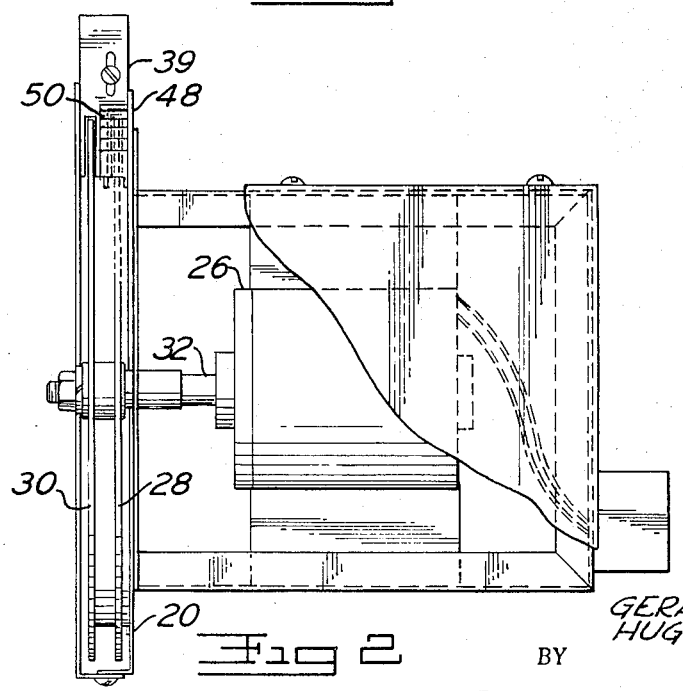
FIG. 2 is a plan view of the apparatus, partially in section, taken along line 2—2 of FIG. 1.

FIG. 1 diagrammatically illustrates a chamber 10 fed by an inlet 12 and evacuated by an outlet 14. It is to be understood that the chamber 10 may be of any size necessary for the facility involved. Its sole function is to provide a confined space for cleaning, filtering and/or cooling moving gas. Usually, it is air that moves through the chamber and the air is cooled by the vaporization of water sprayed in a curtain across its flow path; simultaneous cleaning occurs in the obvious manner.

A foraminous wall 16 extends transverse to the direction of air flow. Its function is to prevent the entrainment of large droplets of water in the stream of gas passing through the chamber, assist in mixing the cleansed gas, prevent any large bodies from being retained in the flow and assist in equalizing humidity in the exiting gases. The foraminous wall itself is not novel as to this invention, it can be of any conventional shape, thickness or composition as needed.

In the bottom of the chamber is a pool of water 18. Partially immersed in the water is a curved container, hereinafter referred to as shroud 20. It will be noted in FIG. 3 that the upwardly opening shroud 20 includes only one side opening 22 for water. The size of opening 22 is regulated by a gate 24. The purpose of the regulation will be explained subsequently.

In the particular embodiment shown, a motor 26 drives two discs 28 and 30 which are mounted coaxially on a shaft 32. It should be noted that the preferred embodiment of this apparatus includes only two discs, however, many more discs can be mounted on shaft 32 to get a more uniform spray, if desired. Usually the discs operate best in pairs.

In the particular embodiment found most useful the discs 28 and 30 are approximately seven and one-half inches in radius and are rotated at about 1,750 rpms. As will be observed in FIG. 3, the periphery of each disc is undulating and in fact the peripheries include a plurality of small cavities or depressions 33 for containing water while submerged. The surfaces of these cavities are in fact more properly defined as inflected cycloidal curves wherein the depth of a cavity 33 is equal to approximately one-quarter inch. The purpose of the cavity is obviously to pick up more water which will be broken up and sprayed as small particles into the air to form the fog curtain across the chamber.

The combination of the rotating discs 28 and 30 and the curved inner shroud surface 34 serves as a kind of pump. It will be noted that spacing between the surface 34 and the periphery 36 of the discs 28 and 30 is decreasing in the direction of rotation. Accordingly, the highest water pressure will be at the minimum spacing between the periphery 36 and the curved surface 34. In the preferred embodiment, the spacing decreases from about 1 inch at 37 to about three-eighths of an inch at 38.

To assist in breaking up the water into a plurality of small droplets, a first slotted plate 39 is provided adjacent the point of minimum spacing 38 between the disc periphery and the surface of the shroud. The bottoms and sides of the slots 40 and 42 are cut to knife edges as best seen in FIGS. 5 and 5A. The knife edges help to break the droplets of water into smaller particles. The bottom and sides of the slots can be set to give various clearances. The spray becomes finer as the clearance is reduced, the smallest desirable water particles result from a minimum clearance of about 1/16 inch and the maximum clearance should not exceed about ¼ inch.

The discs will fling water tangentially of their peripheries and because of the curved or undulating periphery, water in the bottom of the cavities 33 will flow to the peaks 44 before it is flung in a tangential direction. Thus, the undulating surface gives the resulting fan shaped spray a wider angle for each disc. To provide even greater directional control for the spray, veins 46 are provided on a vertical shield 48. Additionally, on at least one of the discs a peripherally extending U-shaped shield 50, coaxial with the disc, extends partially around its circumference. In this particular instance, the water vapor and droplets broken up by the knife edge of slot 40 are pumped by the rotating disc, in the same manner as any other fluid, until it exits from the mouth 52 where it will be discharged in a fan shaped pattern across the chamber. A second slotted plate 39 with an identical function is located at the mouth 52 which is about 90° from first plate 39.

It should be noted that the purpose of the vertically extending shield 48 is to minimize the throw of large particles of water in the direction of the foraminous wall 16. It is not particularly desirable to have water contacting and running down the surface of the wall 16 because this tends to slow the flow of gas through the chamber. The purpose of the foraminous wall is to promote mixing, equal humidity and cooling of the gas within the chamber and also to prevent the entrainment of large particles of water or whatever from being drawn through the outlet 14 and into the usable stream of gas.

As previously pointed out the maximum spacing between the periphery 36 of the rotating discs and the surface 34 of the shroud should be about 1 inch to ¾ inches and the minimum spacing should be about three-eighths inches. The minimum spacing between the knife edges of slots 40 and 42 and the periphery of the discs should be about one-eighth inch to five-sixteenths inches. Additionally, the spacing between the periphery of the disc and the surface of the U-shaped shield 50 should be about in the range ¼ inch to one inch, with ½ inch being preferred.

It should be noted that when the discs are rotating and water is being sprayed, the elevation 54 of the water within the shroud 20 will be drawn down as compared to the elevation 56 of the water outside the shroud which is usually at about one-half inch above the elevation of the plate 39. Substantially higher or lower outside water levels create inefficiency in the performance. Why this is true is unknown but the fact has been experimentally determined.

The flow of water into the shroud through the opening 22 and over the edges of the shroud will eventually reach an equilibrium with the amount sprayed and the inside water level will stabilize. However, knowledge of the particular water elevation within the shroud is not critical because there is no need to measure it directly. What is measured is the load on the electric motor. The higher the elevation of the water within the shroud, the greater will be the load on the motor to keep the discs turning at 1,750 rpm. The gate 24 will be regulated on each unit as it goes out of the factory, such that the load on the motor will be uniform and thus the spray will be uniform. Accordingly, there is no need for a very close tolerance on the exact height of the axis of the discs in relation to the bottom of the tank. Similarly, the spacing of the bottom of the shroud from the bottom of the tank is not critical. Necessary adjustments of the gate 24 to obtain the proper opening may be determined by simply measuring the input of the circuit of the electric motor at the time the unit is ready to leave the factory. Before the unit is shipped, the gate 24 will be locked rigidly in the position indicated as desirable by the ammeter. In the preferred embodiment a ½ horsepower motor is used and the gate 24 is adjusted to a position such that the current drawn is equal to the ampere rating of the motor. Increasing the size of the opening 22 will increase the electric current and vice versa.

It is clear that regulating the spacing between the discs 28 and 30 and surface 34 can also be used to regulate the load on the motor. However, with a motor of given rating, it is preferred that the spacing be standardized. Clearly, different sizes of motors and rpm ratings will dictate different load characteristics.

I claim:

1. In an apparatus for filtering, washing and cooling gases the combination including:
    inlet ducting for conducting said gas to a chamber and outlet ducting for conducting gas away from said chamber, a foraminous wall within said chamber extending transverse to the direction of gas flow and through which said gas passes in its trip from the inlet ducting to the outlet ducting, means for forcing said gas through said foraminous wall and means for spraying a curtain of water across the chamber between the inlet and the wall, said water serving to filter, wash and cool said gas, said foraminous wall serving to prevent entrainment of large droplets of water in the stream of gas passing therethrough, the improvement comprising,
    the means for spraying water including a plurality of discs rotating in vertical planes substantially perpendicular to the flow of said gas, the lower portions of said discs being covered with water,
    the periphery of said discs include a plurality of small cavities for containing water,
    a shroud encompassing the submerged portions of said discs, the bottom of said shroud being curved with said curve having an axis substantially parallel with the axis of said discs, the spacing between the discs and the shroud being greater at the points of entry into the water than at the points of exit from said water, shield means extending partially around the periphery of at least one disc above the water level for controlling the direction of the water sprayed from said disc.

2. The apparatus of claim 1 wherein the shield means is curved and substantially coaxial with said discs.

3. The apparatus of claim 1 wherein the surface of the shield means is radially spaced from the periphery of the disc a distance not substantially greater than one inch nor substantially less than ¼ inches.

4. The apparatus of claim 3 wherein the minimum spacing between the periphery and the shroud is not substantially greater than 3/8 inches.

5. The apparatus of claim 1 wherein the minimum spacing between the periphery and the shroud is not substantially greater than ⅜ inches.

6. The apparatus of claim 1 wherein the surfaces of said cavities in the periphery of said disc are defined by an inflected cycloidal curve.

7. The apparatus of claim 6 including a slotted plate attached to the shroud at the end adjacent the points of exit of the discs from the water, said slots receiving the peripheries of the rotating discs therein, said plate being adjustable to control the spacing between the peripheries of said discs and the bottoms of said slots for controlling the size of the droplets of water sprayed.

8. The apparatus of claim 7 wherein the minimum spacing between the periphery and the shroud is not substantially greater than ⅜ inches.

9. The apparatus of claim 1 including a slotted plate attached to the shroud at the end adjacent the points of exit of the discs from the water, said slots receiving the peripheries of the rotating discs therein, said plate being adjustable to control the spacing between the periphery of said discs and the bottoms of said slots for controlling the size of the droplets of water sprayed.

* * * * *